(12) United States Patent
Thorpe et al.

(10) Patent No.: US 8,641,122 B2
(45) Date of Patent: Feb. 4, 2014

(54) DECKLID ASSEMBLY FOR A VEHICLE

(75) Inventors: Scott W. Thorpe, Milford, MI (US);
Scott D. Stacherski, Livonia, MI (US);
Richard D. Janke, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/410,579

(22) Filed: Mar. 2, 2012

(65) Prior Publication Data

US 2013/0229026 A1    Sep. 5, 2013

(51) Int. Cl.
*B62D 25/10* (2006.01)
(52) U.S. Cl.
USPC ............................................ 296/76; 296/106
(58) Field of Classification Search
USPC .......................... 296/50, 76, 1.02, 146.8, 152
See application file for complete search history.

(56) References Cited

U.S. PATENT DOCUMENTS

| 4,358,150 | A | * | 11/1982 | Nash | 296/50 |
| 5,211,436 | A | * | 5/1993 | Feder | 296/76 |
| 6,692,057 | B2 | * | 2/2004 | Igarashi et al. | 296/76 |
| 2010/0019522 | A1 | * | 1/2010 | Nakamura | 296/50 |

* cited by examiner

*Primary Examiner* — Joseph Pape
*Assistant Examiner* — Dana Ivey
(74) *Attorney, Agent, or Firm* — Quinn Law Group, PLLC

(57) ABSTRACT

A decklid assembly for a vehicle includes a first panel and a second panel spaced apart from the first panel to define a void therebetween. The decklid assembly also includes a deployable handle assembly at least partially disposed within the void and including a mounting element and a handle. The mounting element defines a cavity therein and is configured for attaching to at least one of the first panel and the second panel, wherein the mounting element extends into the void and abuts the first panel and the second panel. The handle is pivotably attached to the mounting element and is configured for transitioning between a stowed position wherein the handle covers the cavity, and a deployed position wherein the handle does not cover the cavity. A vehicle including the decklid assembly is also disclosed.

19 Claims, 4 Drawing Sheets

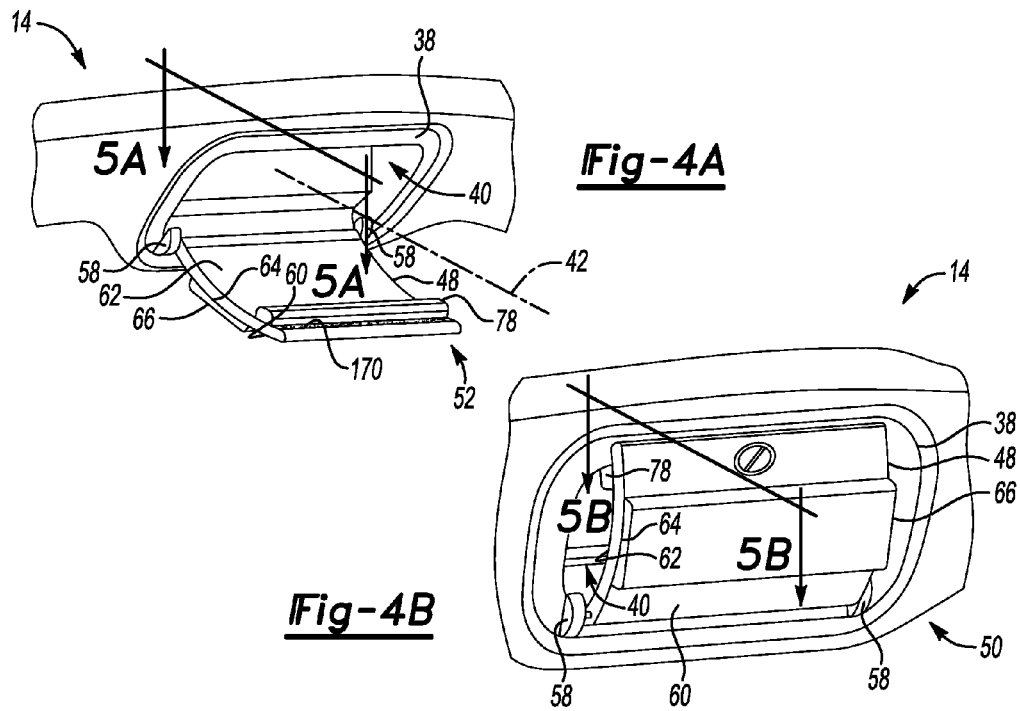
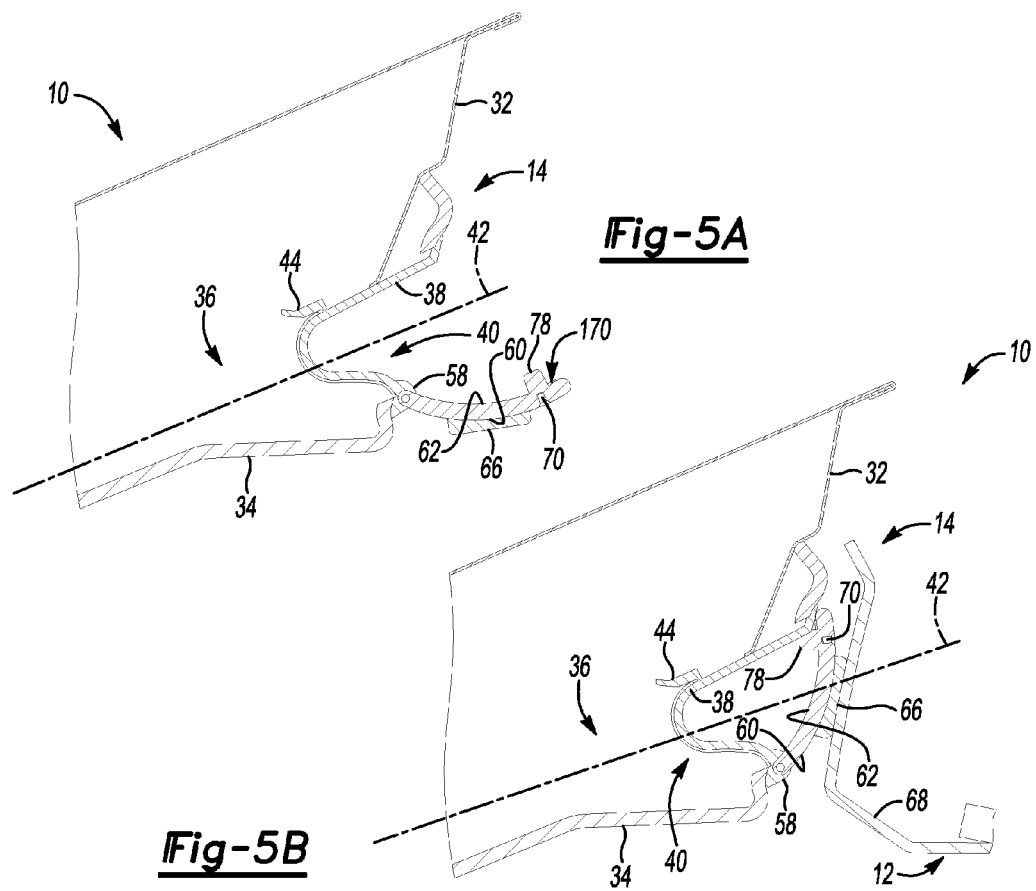

US 8,641,122 B2

DECKLID ASSEMBLY FOR A VEHICLE

TECHNICAL FIELD

The present disclosure generally relates to a decklid assembly for a vehicle.

BACKGROUND

Vehicles generally include one or more storage compartments configured for stowing cargo during vehicle travel. For example, passenger sedans often include a trunk compartment configured for storing luggage, packages, and the like. The trunk compartment is often separated from a passenger compartment of the vehicle, and is accessible via a decklid assembly that pivots between an open position and a closed position to respectively uncover and cover the trunk compartment. That is, an operator of the vehicle may manually pivot the decklid assembly away from the vehicle body to access the trunk compartment, and may manually pivot the decklid assembly toward the vehicle body until the decklid assembly latches to the vehicle body and thereby covers the trunk compartment.

SUMMARY

A decklid assembly for a vehicle includes a first panel, a second panel spaced apart from the first panel to define a void therebetween, and a deployable handle assembly at least partially disposed within the void. The deployable handle assembly includes a mounting element and a handle pivotably attached to the mounting element. Further, the mounting element defines a cavity therein and is configured for attaching to at least one of the first panel and the second panel. The mounting element extends into the void and abuts the first panel and the second panel. The handle is configured for transitioning between a stowed position wherein the handle covers the cavity, and a deployed position wherein the handle does not cover the cavity.

In one embodiment, the decklid assembly includes a plurality of deployable handle assemblies. Each of the plurality of deployable handle assemblies is spaced apart from one another, is at least partially disposed within the void, and includes a mounting element and a handle. The mounting element defines a cavity therein having a central longitudinal axis. The mounting element is also configured for attaching to at least one of the first panel and the second panel, extends into the void, and abuts the first panel and the second panel. The handle is pivotably attached to the mounting element and is configured for transitioning between a stowed position wherein the handle covers the cavity, and a deployed position wherein the handle does not cover the cavity. In addition, the handle is pivotable about a pivot axis disposed substantially perpendicular to the central longitudinal axis, and has a first surface and a second surface spaced opposite the first surface. The handle includes a bumper disposed on the first surface and configured for contacting the vehicle, and a protrusion extending from the second surface and configured for abutting the mounting element when the handle is disposed in the stowed position.

A vehicle includes a body defining a trunk compartment therein, and a decklid assembly pivotably attached to the body. The decklid assembly is configured for transitioning between a closed position wherein the decklid assembly covers the trunk compartment and sealingly abuts the body, and an open position wherein the decklid assembly does not sealingly abut the body. The decklid assembly includes a first panel, a second panel spaced apart from the first panel to define a void therebetween, and a deployable handle assembly at least partially disposed within the void. The deployable handle assembly includes a mounting element and a handle pivotably attached to the mounting element. The mounting element defines a cavity therein and is configured for attaching to at least one of the first panel and the second panel. In addition, the mounting element extends into the void and abuts the first panel and the second panel. The handle is configured for transitioning between a stowed position wherein the handle covers the cavity, and a deployed position wherein the handle does not cover the cavity.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

BRIEF DESCRIPTION OF THE DRAWINGS

FIG. 4A is a schematic perspective fragmentary illustration of the deployable handle assembly of FIG. 2, wherein the deployable handle assembly includes a handle disposed in a deployed position;

FIG. 4B is a schematic perspective fragmentary illustration of the deployable handle assembly of FIG. 4A, wherein the handle is disposed in a stowed position;

FIG. 5A is a schematic cross-sectional fragmentary illustration of the deployable handle assembly of FIG. 4A taken along section lines 5A-5A;

FIG. 5B is a schematic cross-sectional fragmentary illustration of the deployable handle assembly of FIG. 4B taken along section lines 5B-5B, wherein the deployable handle assembly abuts a body of the vehicle of FIGS. 1A and 1B;

DETAILED DESCRIPTION

Figure 1A:
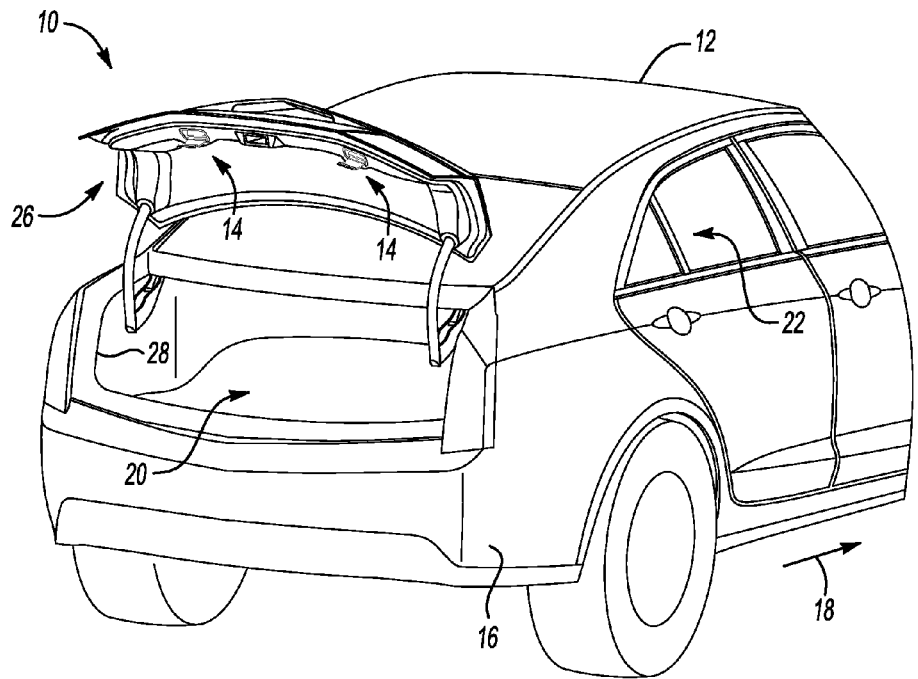
FIG. 1A is a schematic perspective fragmentary illustration of a vehicle including a decklid assembly disposed in an open position.

Referring to the Figures, wherein like reference numerals refer to like elements, a decklid assembly 10 for a vehicle 12 is shown generally in FIG. 1A. The decklid assembly 10 includes a deployable handle assembly 14 that is useful for assisting an operator (not shown) of the vehicle 12 in closing the decklid assembly 10 to a body 16 of the vehicle 12. As such, the decklid assembly 10 may be useful for, for example, automotive vehicles such as passenger sedans, wherein the body 16 defines a trunk compartment 20 therein. However, the decklid assembly 10 and vehicle 12 may also be useful for non-automotive applications including recreational vehicles, construction vehicles, emergency vehicles, and the like.

Directional terminology used herein pertaining to the vehicle 12 is understood by one skilled in the art. For example, terminology such as "front", "forward", and "fore" generally refers to a leading portion of the vehicle 12 with respect to a direction of vehicle travel (indicated generally by arrow 18 in FIG. 1A). Likewise, terminology such as "rear", "rearward", and "aft" generally refers to a trailing portion of the vehicle 12 with respect to the direction of vehicle travel 18. As shown in FIG. 1A, the vehicle 12 defines an interior passenger compartment (shown generally at 22), and components not disposed within the passenger compartment 22 are generally referenced as the body 16 or exterior of the vehicle 12.

Figure 1B:
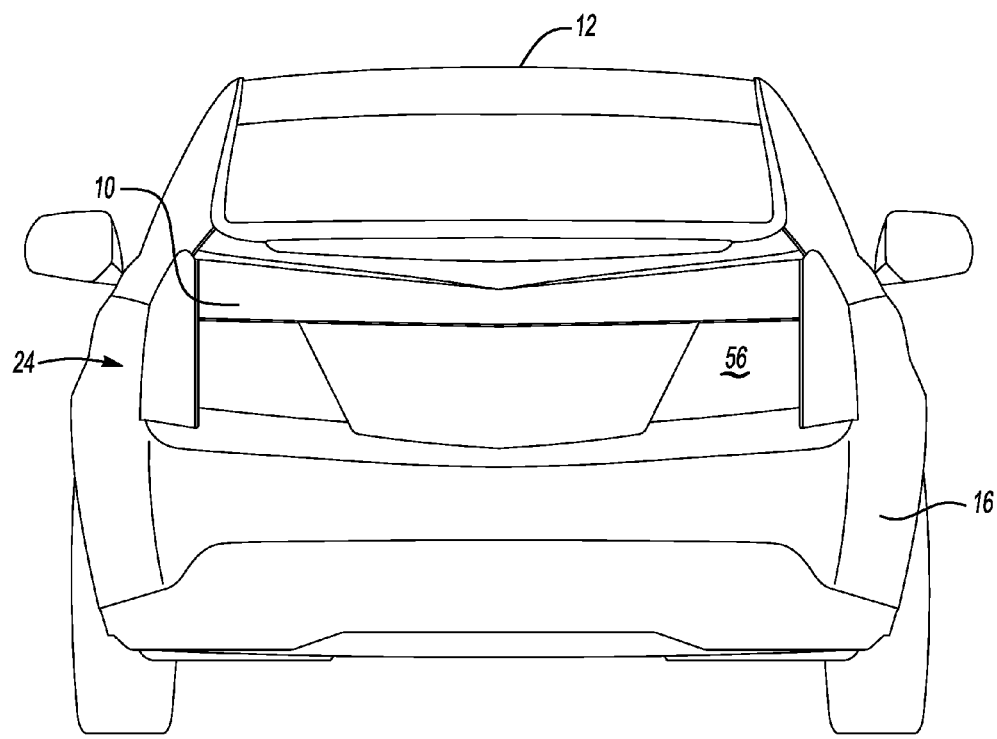
FIG. 1B is a schematic elevational illustration of a rear of the vehicle of FIG. 1A including the decklid assembly disposed in a closed position.
Figure 2:
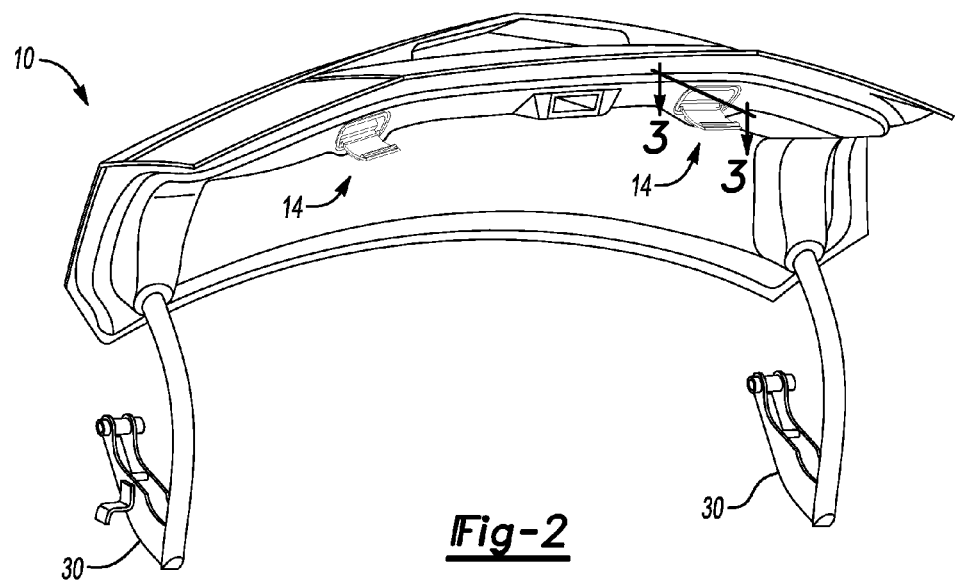
FIG. 2 is a schematic perspective illustration of the decklid assembly of FIGS. 1A and 1B, wherein the decklid assembly includes a deployable handle assembly.

With continued reference to FIG. 1A, the vehicle 12 includes the body 16, and the decklid assembly 10 pivotably attached to the body 16. More specifically, the body 16 defines the trunk compartment 20 therein, and the decklid assembly 10 is configured for transitioning between a closed position (illustrated generally at 24 in FIG. 1B) wherein the decklid assembly 10 covers the trunk compartment 20 and sealingly abuts the body 16, and an open position (illustrated generally at 26 in FIG. 1A) wherein the decklid assembly 10 does not sealingly abut the body 16. That is, when disposed in the closed position 24 (FIG. 1B), the decklid assembly 10 may abut one or more seals 28 (FIG. 1A) or weatherstrips to sealingly close off the trunk compartment 20 from elements exterior to the vehicle 12. The decklid assembly 10 may be pivotably attached to the body 16 in any suitable manner. For example, as best shown in FIG. 2, the decklid assembly 10 may be pivotably attached to the body 16 by a plurality of hinges 30 or arms.

Further, as used herein, the terminology trunk compartment 20 refers to a cavity or compartment in which luggage, a spare tire, and other articles such as packages, groceries, and the like may be stored and segregated from the passenger compartment 22 (FIG. 1A) of the vehicle 12. As such, it is to be appreciated that, although shown disposed at the rear of the vehicle 12 in FIGS. 1A and 1B, the trunk compartment 20 may alternatively be disposed at the front of the vehicle 12.

Figure 3:
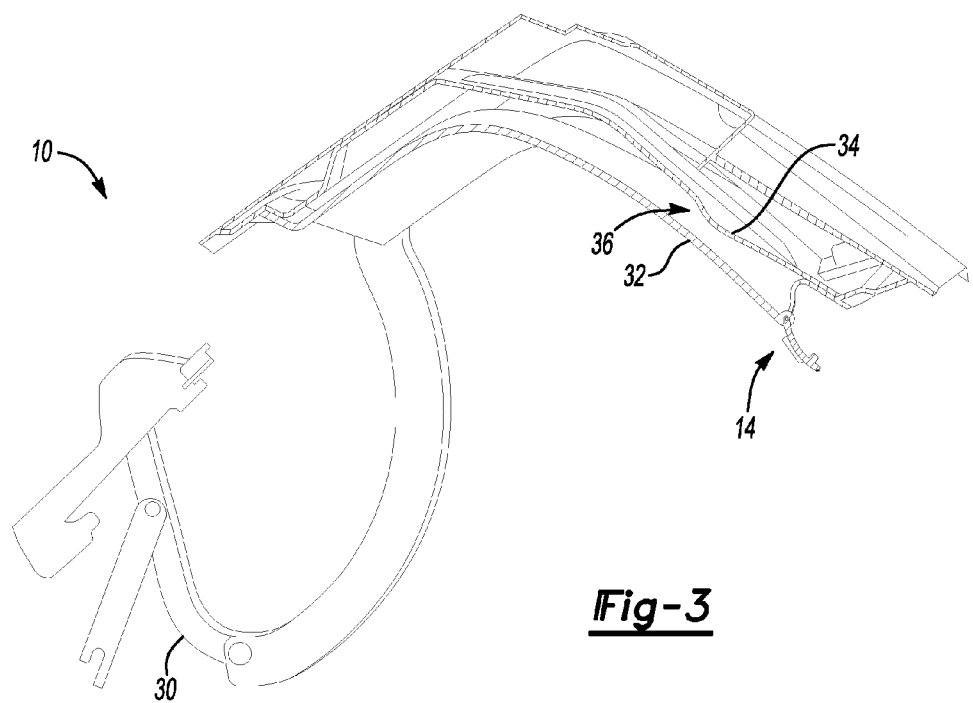
FIG. 3 is a schematic cross-sectional illustration of the decklid assembly of FIG. 2 taken along section lines 3-3.

Referring now to FIG. 3, the decklid assembly 10 includes a first panel 32 and a second panel 34 spaced apart from the first panel 32 to define a void 36 therebetween. For example, the first panel 32 may be a trim panel and the second panel 34 may be a structural panel or a body panel. The first panel 32 and the second panel 34 may be disposed generally parallel to one another along at least a portion of the decklid assembly 10 to define the void 36 therebetween. The void 36 may be configured for housing, for example, wiring, insulating materials, and/or other components of the vehicle 12.

With continued reference to FIG. 3, the decklid assembly 10 includes the deployable handle assembly 14 at least partially disposed within the void 36. That is, the deployable handle assembly 14 may extend into the void 36, and at least a portion of the deployable handle assembly 14 may be disposed between the first panel 32 and the second panel 34. Generally, the deployable handle assembly 14 may assist an operator (not shown) of the vehicle 12 (FIG. 1A) in transitioning the decklid assembly 10 to the closed position 24 (FIG. 1B). That is, as shown in FIG. 2, the deployable handle assembly 14 may provide a readily-accessible, easily-identifiable "grab" element with which the operator may close the decklid assembly 10, as set forth in more detail below. Further, as best shown in FIG. 2, the decklid assembly 10 may include a plurality of deployable handle assemblies 14, wherein each of the deployable handle assemblies 14 is spaced apart from one another and at least partially disposed within the void 36 (FIG. 3). For example, the decklid assembly 10 may include two deployable handle assemblies 14.

Referring now to FIGS. 5A and 5B, the deployable handle assembly 14 includes a mounting element 38 defining a cavity 40 therein and configured for attaching to at least one of the first panel 32 and the second panel 34. The mounting element 38 may have any shape or configuration. In one non-limiting embodiment shown in FIGS. 6A and 6B, the mounting element 38 may be generally configured as a cup that defines the cavity 40 therein. In another non-limiting embodiment shown in FIGS. 7A and 7B, the mounting element 138 may be generally configured as a frame element or bracket that defines the cavity 40 therein. Further, the cavity 40 may have a central longitudinal axis 42, as best shown in FIGS. 5A, 5B, 7A, and 7B. As such, the mounting element 38 extends into the void 36, e.g., along the central longitudinal axis 42, and abuts the first panel 32 and the second panel 34.

Figure 6A:
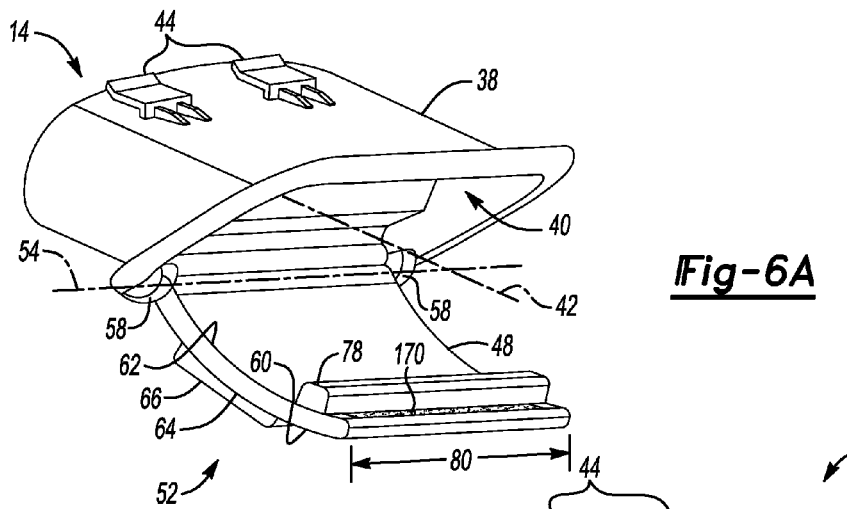
FIG. 6A is a schematic perspective illustration of the deployable handle assembly of FIGS. 4A-5B, wherein the deployable handle assembly includes a mounting element configured as a cup.
Figure 6B:
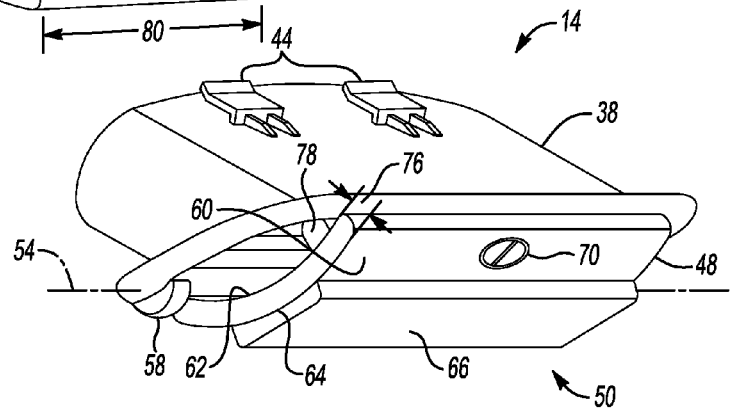
FIG. 6B is a schematic perspective illustration of the deployable handle assembly of FIG. 6A, wherein the handle is disposed in the stowed position.
Figure 7A:
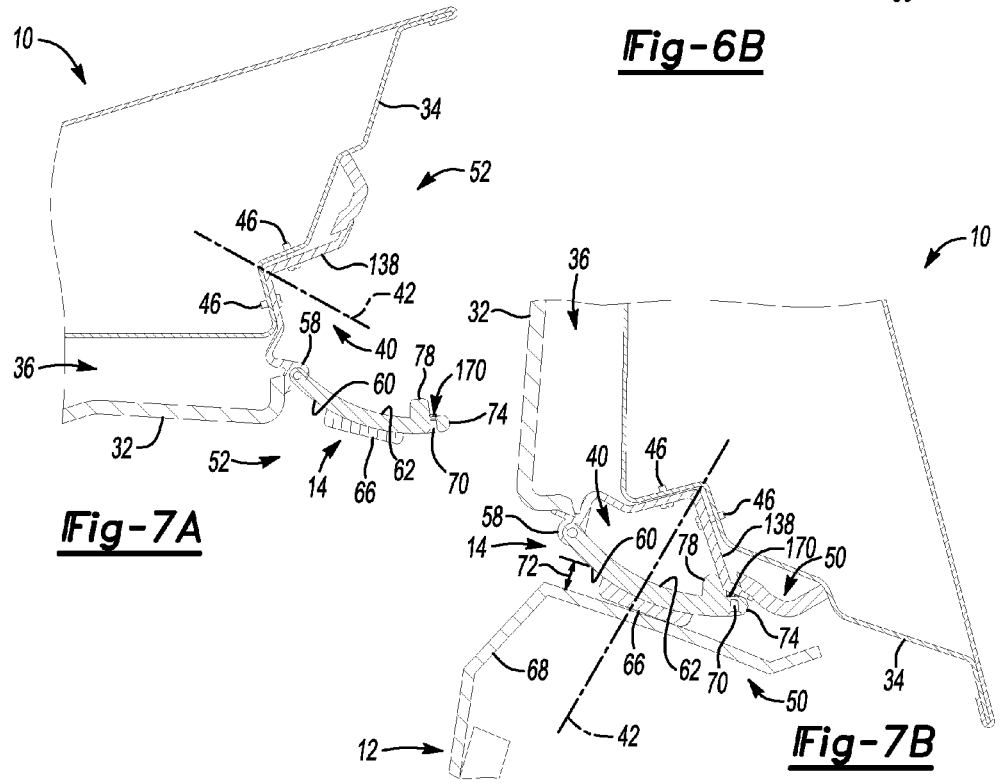
FIG. 7A is a schematic cross-sectional fragmentary illustration of another embodiment of the deployable handle assembly of FIGS. 4A-6B, wherein the deployable handle assembly includes a mounting element configured as a bracket.
Figure 7B:
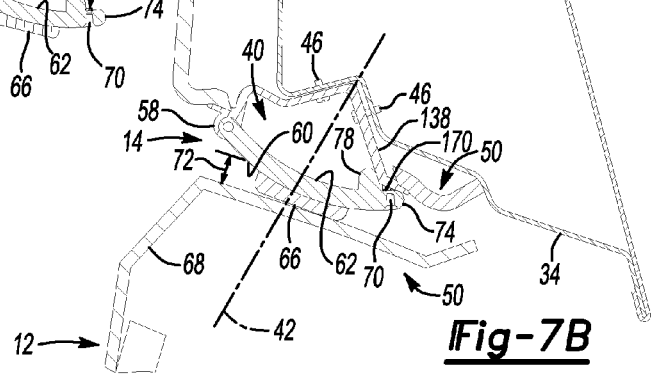
FIG. 7B is a schematic cross-sectional fragmentary illustration of the deployable handle assembly of FIG. 7A, wherein the handle is disposed in the stowed position and abuts the body of the vehicle of FIGS. 1A and 1B.

With continued reference to FIGS. 5A-7B, the mounting element 38, 138 may attach to the at least one of the first panel 32 and the second panel 34 in any manner. By way of a non-limiting example, as described with reference to FIGS. 5A-6B, the mounting element 38 may include one or more clips 44 arranged to join the mounting element 38 to the first panel 32 (FIGS. 5A and 5B) and/or second panel 34 (FIGS. 5A and 5B). Alternatively, the mounting element 38 may attach to the first panel 32 and/or second panel 34 via an interference fit. Referring to FIGS. 7A and 7B, by way of another non-limiting example, the mounting element 138 may be attached to at least one of the first panel 32 and the second panel 34 with one or more fasteners 46, such as a rivet or screw.

Referring now to FIGS. 4A and 4B, the deployable handle assembly 14 also includes a handle 48 pivotably attached to the mounting element 38 and configured for transitioning between a stowed position (shown generally at 50 in FIG. 4B) wherein the handle 48 covers the cavity 40, and a deployed position (shown generally at 52 in FIG. 4A) wherein the handle 48 does not cover the cavity 40. For example, as set forth in more detail below, the handle 48 may be transitionable to the deployed position 52 (FIG. 4A) when the decklid assembly 10 (FIG. 1A) is disposed in the open position 26 (FIG. 1A). That is, the handle 48 may present to an operator (not shown) when the trunk compartment 20 is "open", i.e., when the decklid assembly 10 is disposed in the open position 26 (FIG. 1A).

Conversely, with continued reference to FIGS. 4A and 4B, the handle 48 may automatically transition to the stowed position 50 (FIG. 4B) when the decklid assembly 10 (FIG. 1B) is disposed in the closed position 24 (FIG. 1B), as set forth in more detail below. Therefore, the handle 48 may be disposed in the deployed position 52 (FIG. 4A) only when the decklid assembly 10 (FIG. 1A) is disposed in the open position 26 (FIG. 1A). However, it is also contemplated that the handle 48 may be disposed in the stowed position 50 (FIG. 4B) when the decklid assembly 10 (FIG. 1B) is disposed in either of the open position 26 (FIG. 1A) or the closed position 24 (FIG. 1B).

Therefore, during operation, the handle 48 may pivot from the stowed position 50 (FIG. 4B) to the deployed position 52 (FIG. 4A) in any manner. For example, the handle 48 may pivot to the deployed position 52 (FIG. 4A) due to gravity or as an operator (not shown) pulls on the handle 48 as the decklid assembly 10 (FIG. 1A) is "opened", i.e., as the decklid assembly transitions from the closed position 24 (FIG. 1B) to the open position 26 (FIG. 1A). That is, the handle 48 may self-present so as to automatically transition to the deployed position 52 (FIG. 4A) when the decklid assembly 10 is disposed in the open position 26 (FIG. 1A).

As described with reference to FIG. 6A, the handle 48 is pivotable about a pivot axis 54 disposed substantially perpendicular to the central longitudinal axis 42. Stated differently, the pivot axis 54 may be disposed substantially parallel to a rear face 56 (FIG. 1B) of the decklid assembly 10 (FIG. 1B) and substantially perpendicular to the direction of vehicle travel 18 (FIG. 1A). Therefore, the deployable handle assembly 14 may further include a resilient member 58 (FIGS. 6A and 6B), such as, but not limited to, a coil spring, that is configured for biasing the handle 48 to the stowed position 50 (FIG. 6B). That is, the handle 48 may remain disposed in the stowed position 50 (FIG. 6B), even when the decklid assembly 10 (FIG. 1A) is disposed in the open position 26 (FIG. 1A), until an operator (not shown) pulls or tugs on the handle 48 to thereby transition the handle 48 to the deployed position 52 (FIG. 6A). Stated differently, in this embodiment, the handle 48 may not automatically transition from the stowed position 50 (FIG. 6B) to the deployed position 52 (FIG. 6A). That is, the handle 48 may not self-present.

Alternatively, in another embodiment, the resilient member 58 (FIG. 6A) may be configured for biasing the handle 48 to the deployed position 52 (FIG. 6A). Therefore, for this embodiment, as the decklid assembly 10 (FIGS. 1A and 1B) transitions from the closed position 24 (FIG. 1B) to the open position 26 (FIG. 1A), the handle 48 may automatically present to an operator (not shown), e.g., by gravity, and transition to the deployed position 52 (FIG. 6A). Stated differently, in this embodiment, the handle 48 may self-present as the decklid assembly 10 (FIG. 1A) is opened and transitions to the open position 26 (FIG. 1A).

Referring again to FIGS. 4A-7B, the handle 48 may have any shape or configuration. By way of a non-limiting example, as best shown in FIGS. 6A and 6B, the handle 48 may have a first surface 60 and a second surface 62 spaced opposite the first surface 60. Further, each of the first surface 60 and the second surface 62 may be curvilinear and may have an apex 64.

In addition, with continued reference to FIGS. 6A and 6B, the handle 48 may include a bumper 66 disposed on the first surface 60 and configured for contacting the vehicle 12 (FIGS. 1A and 1B). The bumper 66 may have any shape or configuration, but may be arranged to contact the vehicle 12 at, for example, a sill trim 68 (FIGS. 5B and 7B), so as to protect the decklid assembly 10 (FIGS. 5B and 7B) from slam over travel. As used herein, the terminology "slam over travel" refers to a condition wherein an operator (not shown) closes the decklid assembly 10 with such force that the first panel 32 (FIG. 5B) and/or the second panel 34 (FIG. 5B) of the decklid assembly 10 slams into the vehicle 12. The bumper 66 may therefore cushion contact between the decklid assembly 10 and the vehicle 12 as an operator closes the decklid assembly 10, i.e., as the decklid assembly 10 transitions from the open position 26 (FIG. 1A) to the closed position 24 (FIG. 1B).

In one non-limiting example shown in FIG. 6B, the bumper 66 may be rectangular and may be attached to the first surface 60 at the apex 64. Attaching the bumper 66 to the first surface 60 at the apex 64 minimizes contact between the first surface 60 and the vehicle 12, e.g., the sill trim 68 (FIGS. 5B and 7B), as the decklid assembly 10 transitions to the closed position 24 (FIG. 1B).

Further, the bumper 66 may be formed from a resilient material such as, but not limited to, an elastomer, e.g., rubber. As such, the bumper 66 may cushion the decklid assembly 10 as the decklid assembly 10 transitions to the closed position 24 (FIG. 1B), e.g., when the decklid assembly 10 is inadvertently slammed shut by an operator (not shown). Therefore, the first surface 60 may not contact the body 16 (FIGS. 1A and 1B) when the decklid assembly 10 is disposed in the closed position 24 (FIG. 1B). Rather, only the bumper 66 may contact the body 16 when the decklid assembly 10 is disposed in the closed position 24.

In addition, as best shown in FIGS. 7A and 7B, the deployable handle assembly 14 may further include an adjustment device 70, 170 configured for adjusting a distance 72 (FIG. 7B) between the first surface 60 and the vehicle 12, e.g., the body 16 (FIG. 1A) or the sill trim 68 (FIG. 7B), when the handle 48 is disposed in the stowed position 50 (FIG. 7B). For example, the bumper 66 may be adjustably attachable to the handle 48. That is, although not shown, the adjustment device 70 may be configured to threadably contact the bumper 66 through a borehole (not shown) defined by each of the bumper 66 and the handle 48, e.g., at the apex 64 of the first surface 60 and the second surface 62.

In another example described with reference to FIGS. 7A and 7B, the adjustment device 70 may be a screw that may be tightened or loosened during assembly of the vehicle 12 (FIG. 1A) to thereby ensure proper contact between the bumper 66 and the vehicle 12 when the decklid assembly 10 is disposed in the closed position 24 (FIG. 1B). For example, the adjustment device 70 may move a pad 170 disposed on a distal end 74 of the second surface 62 so as to increase or decrease a thickness 76 (FIG. 6B) of the handle 48 according to a desired distance 72 (FIG. 7B) between the bumper 66 and the vehicle 12. As such, a vehicle assembler (not shown) may adjust the fit of the deployable handle assembly 14 according to the dimensions of each vehicle 12. That is, the decklid assembly 10 and deployable handle assembly 14 may compensate for any dimensional variations of the as-assembled vehicle 12 to meet desired manufacturing and assembly tolerances for fit between the decklid assembly 10 and the body 16 (FIG. 1A).

With continued reference to FIGS. 6A and 6B, the handle 48 may also include a protrusion 78 extending from the second surface 62 and configured for abutting the mounting element 38 when the handle 48 is disposed in the stowed position 50 (FIG. 6B). That is, the protrusion 78 may abut the mounting element 38 when the handle 48 is disposed in the stowed position 50 (FIG. 6B), and may be spaced apart from the mounting element 38 when the handle 48 is disposed in the deployed position 52 (FIG. 6A). The protrusion 78 may have any shape or configuration and may function as a fingerhold or grab-assist bar for a vehicle operator (not shown). For example, referring to FIG. 6A, the handle 48 may have a width 80, and the protrusion 78 may extend along a substantial entirety of the width 80. Further, the handle 48 and the protrusion 78 may be integral to minimize manufacturing and assembly complexity of the handle 48.

Therefore, the decklid assembly 10 (FIG. 1A) and vehicle 12 (FIG. 1A) facilitate easy and efficient closing of the decklid assembly 10 to the body 16 (FIG. 1A) of the vehicle 12 by a vehicle operator. That is, the decklid assembly 10 minimizes operator effort required for transitioning the decklid assembly 10 from the open position 26 (FIG. 1A) to the closed position 24 (FIG. 1B). In addition, the bumper 66 (FIG. 4A) of the deployable handle assembly 14 minimizes slam over travel of the decklid assembly 10 as the decklid assembly 10 transitions from the open position 26 to the closed position 24. Further, the deployable handle assembly 14 is adjustable according to vehicle manufacturing tolerances during vehicle assembly.

While the best modes for carrying out the disclosure have been described in detail, those familiar with the art to which this disclosure relates will recognize various alternative designs and embodiments for practicing the disclosure within the scope of the appended claims.

The invention claimed is:

1. A decklid assembly for a vehicle, the decklid assembly comprising:
   a first panel;
   a second panel spaced apart from the first panel to define a void therebetween; and
   a deployable handle assembly extending into the void so that at least a portion of the deployable handle assembly is disposed between the first panel and the second panel, the deployable handle assembly including:
      a mounting element defining a cavity therein and configured for attaching to at least one of the first panel and the second panel, wherein the mounting element extends into the void and abuts the first panel and the second panel; and
      a handle pivotably attached to the mounting element and transitionable between a stowed position wherein the handle covers the cavity, and a deployed position wherein the handle does not cover the cavity;
      wherein the handle has a first surface and a second surface spaced opposite the first surface and includes:
         a bumper disposed on the first surface; and
         a protrusion extending from the second surface and configured for abutting the mounting element when the handle is disposed in the stowed position.

2. The decklid assembly of claim 1, wherein each of the first surface and the second surface is curvilinear and has an apex.

3. The decklid assembly of claim 2, wherein the bumper is rectangular, attached to the first surface at the apex, and formed from a resilient material.

4. The decklid assembly of claim 1, wherein the deployable handle assembly further includes an adjustment device including:
   a pad disposed on the second surface; and
   a screw translatable into and out of the handle with respect to the pad;
   wherein the screw translates into the handle towards the pad to increase a thickness of the handle.

5. The decklid assembly of claim 1, wherein the protrusion abuts the mounting element when the handle is disposed in the stowed position, and is spaced apart from the mounting element when the handle is disposed in the deployed position.

6. The decklid assembly of claim 5, wherein the handle has a width, and further wherein the protrusion extends along a substantial entirety of the width.

7. A decklid assembly for a vehicle, the decklid assembly comprising:
   a first panel;
   a second panel spaced apart from the first panel to define a void therebetween; and
   a plurality of deployable handle assemblies, wherein each of the plurality of deployable handle assemblies is spaced apart from one another, extends into the void so that at least a portion of each of the plurality of handle assemblies is disposed between the first panel and the second panel, and includes:
      a mounting element defining a cavity therein having a central longitudinal axis, wherein the mounting element is configured for attaching to at least one of the first panel and the second panel, extends into the void, and abuts the first panel and the second panel; and
      a handle pivotably attached to the mounting element and transitionable between a stowed position wherein the handle covers the cavity, and a deployed position wherein the handle does not cover the cavity;
      wherein the handle is pivotable about a pivot axis disposed substantially perpendicular to the central longitudinal axis, has a first surface and a second surface spaced opposite the first surface, and includes:
         a bumper disposed on the first surface; and
         a protrusion extending from the second surface and configured for abutting the mounting element when the handle is disposed in the stowed position.

8. A vehicle comprising:
   a body defining a trunk compartment therein; and
   a decklid assembly pivotably attached to the body and transitionable between a closed position wherein the decklid assembly covers the trunk compartment and sealingly abuts the body, and an open position wherein the decklid assembly does not sealingly abut the body, the decklid assembly including:
      a first panel;
      a second panel spaced apart from the first panel to define a void therebetween; and
      a deployable handle assembly extending into the void so that at least a portion of the deployable handle assembly is disposed between the first panel and the second panel, the deployable handle assembly including:
         a mounting element defining a cavity therein and configured for attaching to at least one of the first panel and the second panel, wherein the mounting element extends into the void and abuts the first panel and the second panel; and
         a handle pivotably attached to the mounting element and transitionable between a stowed position wherein the handle covers the cavity, and a deployed position wherein the handle does not cover the cavity;
         wherein the handle has a first surface and a second surface spaced opposite the first surface, and includes:
            a bumper disposed on the first surface and configured for contacting the body; and
            a protrusion extending from the second surface and configured for abutting the mounting element when the handle is disposed in the stowed position.

9. The vehicle of claim 8, wherein the first surface does not contact the body when the decklid assembly is disposed in the closed position.

10. The vehicle of claim 9, wherein the bumper contacts the body when the decklid assembly is disposed in the closed position.

11. The decklid assembly of claim 1, wherein the cavity has a central longitudinal axis, and further wherein the handle is pivotable about a pivot axis disposed substantially perpendicular to the central longitudinal axis.

12. The decklid assembly of claim 11, wherein the deployable handle assembly further includes a resilient member configured for biasing the handle to the stowed position.

13. The decklid assembly of claim 11, wherein the deployable handle assembly further includes a resilient member configured for biasing the handle to the deployed position.

14. The vehicle of claim 8, wherein the cavity has a central longitudinal axis, and further wherein the handle is pivotable about a pivot axis disposed substantially perpendicular to the central longitudinal axis.

15. The vehicle of claim 14, wherein the handle is transitionable to the deployed position when the decklid assembly is disposed in the open position.

16. The vehicle of claim 15, wherein the handle pivots about the pivot axis towards the trunk compartment due to gravity and automatically transitions to the deployed position when the decklid assembly is disposed in the open position.

17. The vehicle of claim 14, wherein the deployable handle assembly further includes a resilient member configured for biasing the handle to the stowed position.

18. The vehicle of claim 17, wherein the resilient member pivots the handle away from the trunk compartment about the pivot axis so that the handle automatically transitions to the stowed position when the decklid assembly is disposed in the closed position.

19. The vehicle of claim 8, wherein the deployable handle assembly further includes an adjustment device including:
- a pad disposed on the second surface; and
- a screw translatable into and out of the handle with respect to the pad;
- wherein the screw translates into the handle towards the pad to increase a thickness of the handle and adjust a distance between the first surface and the body.

* * * * *